United States Patent
Beck et al.

(10) Patent No.: US 7,405,368 B2
(45) Date of Patent: Jul. 29, 2008

(54) METHOD AND DEVICE FOR WEIGHING PRODUCTS

(75) Inventors: Harald Beck, Pohlheim (DE); Rolf Kreimeyer, Seelze (DE)

(73) Assignee: Mettler-Toledo Garvens GmbH, Giesen (DE)

( * ) Notice: Subject to any disclaimer, the term of this patent is extended or adjusted under 35 U.S.C. 154(b) by 0 days.

(21) Appl. No.: 10/557,279

(22) PCT Filed: May 17, 2004

(86) PCT No.: PCT/EP2004/005299

§ 371 (c)(1),
(2), (4) Date: Apr. 2, 2007

(87) PCT Pub. No.: WO2004/102135

PCT Pub. Date: Nov. 25, 2004

(65) Prior Publication Data

US 2007/0181349 A1 Aug. 9, 2007

(30) Foreign Application Priority Data

May 19, 2003 (DE) ............................. 103 22 504

(51) Int. Cl.
*G01G 19/00* (2006.01)

(52) U.S. Cl. ..................... 177/25.13; 177/145; 177/185

(58) Field of Classification Search ............... 177/25.13, 177/50, 119, 145, 185
See application file for complete search history.

(56) References Cited

U.S. PATENT DOCUMENTS

| | | | | | |
|---|---|---|---|---|---|
| 3,063,635 | A | * | 11/1962 | Gordon | 702/174 |
| 3,276,525 | A | * | 10/1966 | Cass | 177/1 |
| 4,231,439 | A | * | 11/1980 | Hall et al. | 177/25.14 |
| 4,817,026 | A | * | 3/1989 | Inoue et al. | 708/300 |
| 5,300,736 | A | * | 4/1994 | Ehrhardt | 177/145 |
| 5,635,679 | A | | 6/1997 | Kohashi et al. | |
| 5,814,772 | A | * | 9/1998 | Nishimura et al. | 177/145 |
| 5,990,442 | A | * | 11/1999 | Suita et al. | 219/86.25 |

FOREIGN PATENT DOCUMENTS

| | | |
|---|---|---|
| DE | 38 23 191 | 1/1990 |
| EP | 0 421 165 | 4/1991 |
| EP | 0 507 957 | 10/1992 |
| GB | 2 228 092 | 8/1990 |
| WO | 99/36752 | 7/1999 |

* cited by examiner

*Primary Examiner*—Randy W Gibson
(74) *Attorney, Agent, or Firm*—Friedrich Kueffner

(57) ABSTRACT

The invention relates to control scales whereon the weight of products (14) is determined in a dynamic manner during the transport thereof on a weighing strip (4) by means of filtering weight values detected during said transportation. According to the invention, said scales comprise an optimisation device which automatically determines the optimum length of filtering.

10 Claims, 2 Drawing Sheets

METHOD AND DEVICE FOR WEIGHING PRODUCTS

BACKGROUND OF THE INVENTION

1. Field of the Invention

The invention concerns a method for weighing products, wherein the products are individually fed to a measuring interval and conveyed along the measuring interval, during which weight values are determined at regular intervals, and a mean value is formed from the weight values detected on a partial interval of the measuring interval to determine the weighing result. The invention also concerns a device for carrying out this method.

2. Description of the Related Art

With methods of this type, the products are dynamically weighed during their conveyance along the measuring interval. This makes it possible to achieve a high throughput, because in this dynamic operation, in contrast to static weighing, it is not necessary to wait for a stable final value to settle in. In general, of course, the shorter the amount of time that is available for it, the greater is the uncertainty of the dynamic weighing. Numerous disturbances acting on the products during their conveyance along the measuring interval cause oscillations and lead to corresponding fluctuations of the determined weight values.

Therefore, previously known scales that operate by a method of the aforementioned type, which are referred to as control scales (company brochure of Garvens Automation GmbH or EP 0 507 957 A1), have a filtering device, which is provided for the purpose of forming a mean value that comes as close as possible to the true weight value from the weight values detected during the dynamic weighing of each product.

SUMMARY OF THE INVENTION

The objective of the invention is to optimize a method of the aforementioned type with respect to the formation of this mean value and to specify a device that is suitable for carrying out this method.

In accordance with the invention, the objective with respect to the method is achieved by determining the variance of the detected weight values for each of a number of different partial intervals of the measuring interval and selecting the partial interval with the smallest variance for obtaining the weighing result.

The method of the invention is based on the recognition that, contrary to the usual expectation, the maximum utilization of the weight values detected along the measuring interval for forming the mean value does not always yield the best results with respect to the uncertainty of the weighing result. For example, the impact of products such as jars or cans on the measuring interval tends to produce vibrations that only slowly subside. Moreover, disturbance peaks in the measured weight values can also occur along the measuring interval. All of these effects result in an increased standard deviation. In accordance with the invention, by determining the variance of the detected weight values for each of the different partial intervals of the measuring interval, the partial interval with the smallest variance can be found and selected for determining the weighing result. In this regard, only the weight values detected along the selected partial interval of the measuring interval are used to form the mean value, thereby optimizing the uncertainty of the weighing method.

It is advantageous for the method of the invention to be carried out in such a way that a partial interval is preset, and the different partial intervals of the measuring interval are obtained from it by random variations. This makes it especially easy to automate the discovery of the partial interval with the smallest variance. In this regard, the user can bring in his empirical experience through the presetting that he uses and especially predetermine a framework that he sees as desirable for the size of the partial intervals to be used.

Furthermore, in an advantageous embodiment of the method of the invention, it is provided that a lower limit for the distance between the beginning of the partial intervals and the beginning of the measuring interval is preset for the different partial intervals. In particular, this lower limit is preset in such a way that the distance between the beginning of the measuring interval and the beginning of the partial interval is greater than the length of the product in the direction of conveyance. This ensures that only those weight values are considered, during the detection of which the whole length of the product is located on the measuring interval. It can also be advantageous to preset an upper limit for the length of the different partial intervals of the measuring interval. The presetting of this type of length limitation has the advantage that in the determination of the optimum partial interval, no partial intervals of such a great length are used that they cannot be considered optimum from the very beginning. However, this does not exclude the possibility of allowing lengths that exceed the physical length of the measuring interval. This can make sense in the formation of the mean value with the aid of filters, which settle in and subside to the final value with some delay. Although this can result in reduction of the weighing result, this can be easily compensated by suitable computing logarithms.

The invention also provides that the partial intervals are expressed in terms of a travel time along the measuring interval on the basis of the constant rate of conveyance of the products and/or that the limits are expressed in terms of a travel time along the measuring interval on the basis of the constant rate of conveyance of the products. These measures are effective especially if the weight values are detected with a transducer which yields the weight values at regular intervals of time, i.e., at a constant frequency. 1,200 Hz is an example of a typical frequency for load cells. Representation in terms of the given travel time is also effective with respect to the formation of the mean value by means of a filter whose filtering length is expressed by a filtering time.

In accordance with the invention, a device for weighing products that is suitable for achieving the objective of the invention, with a belt conveyor that serves as the measuring interval, to which the products are individually delivered and on which they are conveyed in a direction of conveyance; with a load cell, on which the belt conveyor is supported and which detects weight values at regular time intervals; with a sensor device, which is coordinated with the belt conveyor and detects the leading end and the trailing end of each conveyed product that passes through its detection zone; and with a filtering device for forming a mean value of the weight values detected on a partial interval of the measuring interval; is characterized by the fact that the filtering device is assigned a selection device, which determines the variance of the detected weight values for each of a number of different partial intervals and selects the partial interval with the smallest variance to obtain the weight result.

The following description explains the invention in greater detail with reference to the drawings.

DETAILED DESCRIPTION OF THE INVENTION

Figure 1:
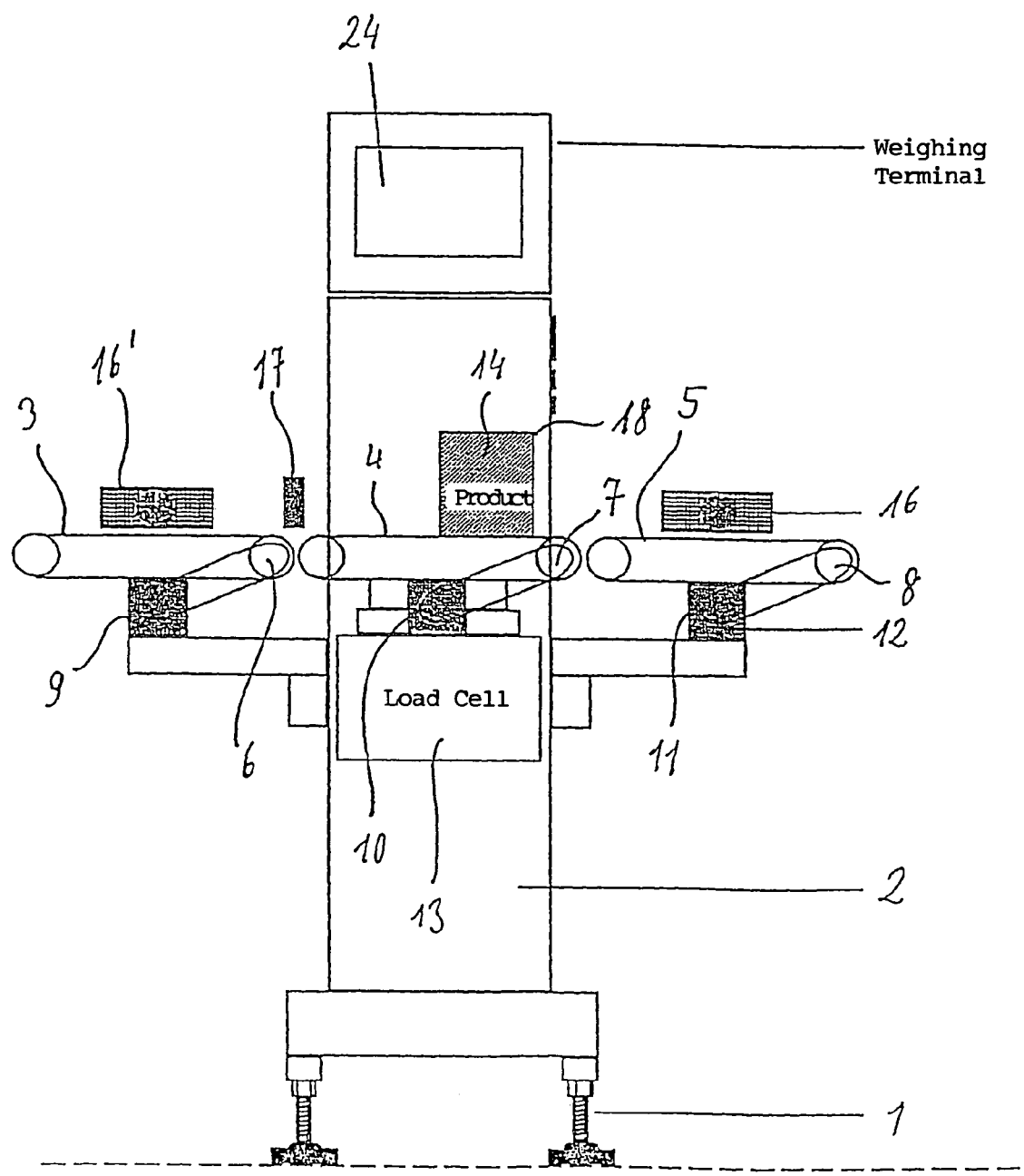
FIG. 1 shows a schematic view of a control scale.

The control scale illustrated in FIG. 1 has a base frame 2 with vertically adjustable supports 1 that support it on the floor. A feed conveyor 3, a belt conveyor 4 that serves as the measuring interval, and a discharge conveyor 5 are successively installed in horizontal alignment on the base frame 2. The three conveyor belts 3, 4, 5 turn in the same direction and at the same speed over two horizontally spaced rollers for each belt, of which the rollers 6, 7, and 8 are driven by electric motors 9, 10, and 11, respectively. These electric motors are automatically controlled in such a way that the adjustment of all three belts 3, 4, 5 to the same belt speed is guaranteed.

At least one of the electric motors (electric motor 11 in the illustrated embodiment) is provided with a tachometer generator 12, which serves as a pulse generator and generates a pulse sequence at a pulse rate that is proportional to the rotation of the drive shaft of the electric motor. The number of pulses of the tachometer generator 12 that occurs per unit time thus corresponds to a conveyance distance that each of the belts 3, 4, 5 travels in this unit of time as it turns.

The belt conveyor 4 that serves as the measuring interval is supported on a load cell 13 mounted on the base frame 2. The load cell delivers weight values that correspond to its load at a preset frequency, for example, 1,200 Hz. Products 14 to be weighed are individually fed by the feed conveyor 3 to the belt conveyor 4 that serves as the measuring interval at the feed end of the belt conveyor 4 with respect to the direction of conveyance. The product 14 that has been fed onto the belt conveyor 4 that serves as the measuring interval is conveyed by belt conveyor 4 to its discharge end with respect to the direction of conveyance, where it is transferred to the discharge conveyor 5. The latter is associated with a sorting device 16, which is only schematically indicated, e.g., in the form of a pusher, with which products 14 of the incorrect weight can be sorted out.

A sensor device 17 in the form of a light barrier is installed at the feed end of the belt conveyor 4 that serves as the measuring interval. This sensor device 17 detects the passage of the leading edge 18 and the trailing edge 19 of the product 14 as the product moves through the light barrier in the direction of conveyance.

Figure 2:
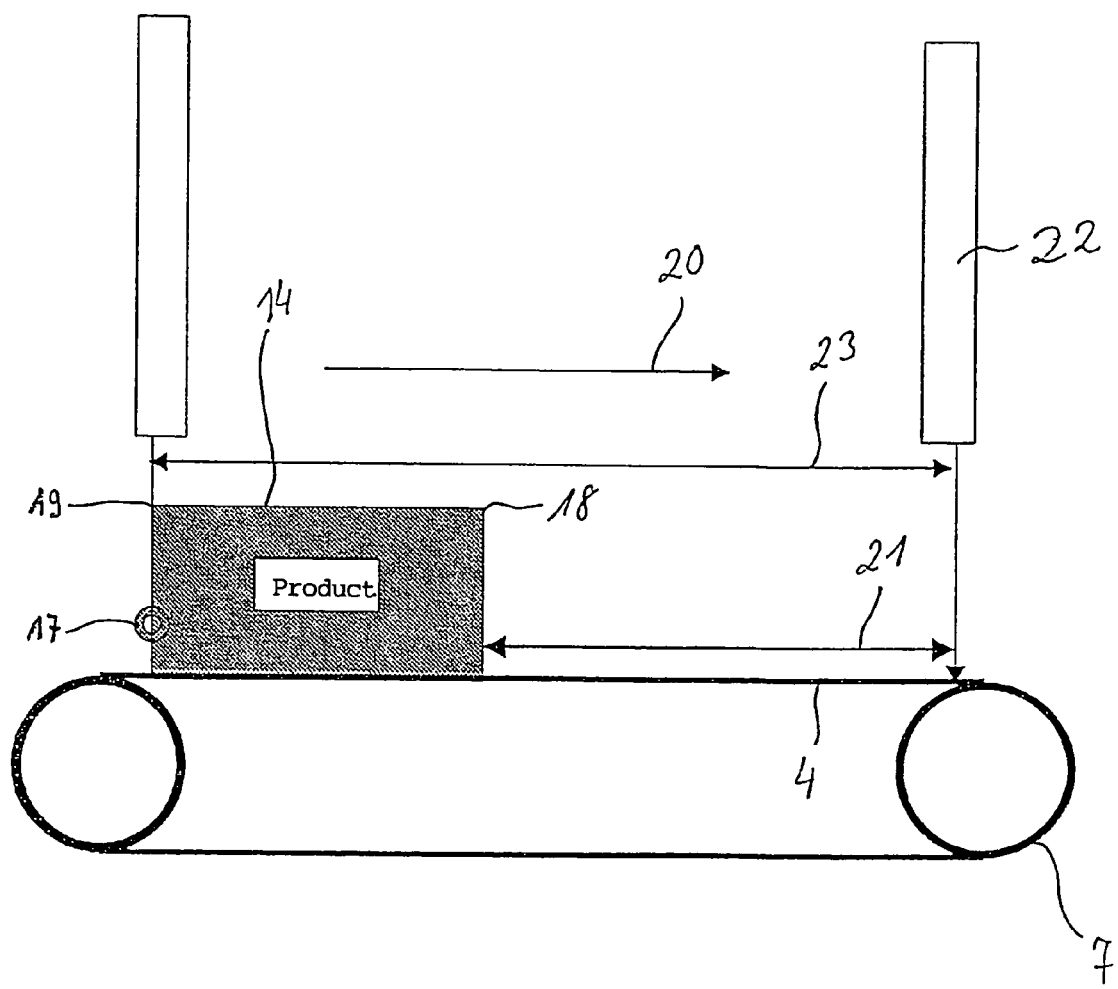
FIG. 2 shows an enlarged schematic view of the control scale belt conveyor, which is supported on a load cell.

This situation is illustrated in FIG. 2, in which the arrow 20 indicates the direction of conveyance. A counter is reset by the output signal of the sensor device 17. The output signal indicates the passage of the leading edge 18 of the product 14. The counter then starts to count the pulses of the tachometer generator 12. The present count of the counter thus gives the distance traveled by the leading edge 18 of the product 14 on the belt conveyor 4 since its passage through the light barrier 17. In FIG. 2, the trailing edge 19 of the product 14 is just passing through the light barrier 17. The count reached by the counter at this instant corresponds to the state in which the product 14 is lying with its full length on the belt conveyor 4 for the first time.

To form the weighing result from the weight values output by the load cell 13, two counts are preset, which determine the beginning and the end of a partial interval through which the product passes. In FIG. 2, this partial interval is illustrated by a double arrow 21. In the situation illustrated in FIG. 2, it is selected in such a way that its beginning is determined by the position of the leading edge 18 of the product 14 when the trailing edge 19 is detected by the sensor device 17. In FIG. 2, the end of the partial interval 21 lies at the discharge end of the belt conveyor 4 that serves as the measuring interval and is designated by a symbolic mark 22. The distance between the sensor device 17 and the mark 22 along the measuring interval is designated by a double arrow 23. The passage of the product 14 through the selected partial interval is thus determined by the count of the counter reaching the preset counts that characterize the beginning and the end of the selected partial interval.

The weight values detected by the load cell 13 during the passage of the product 14 through the selected partial interval 21 are fed to a filtering device, which derives the final weighing result by taking the mean value. For this purpose, the weight values detected by the load cell 13 are continuously input into a buffer storage unit. The buffer storage unit has a capacity that is sufficient for storing all weight values produced during selectable partial intervals. For example, it can be designed to hold 2,000 weight values. The data is stored in the manner of a pushup storage unit, in which the memory content is continuously updated according to the order of input. Therefore, at any given time it contains the last weight value detected by the load cell 13 and all previous weight values until its capacity is exhausted. When the count of the counter reaches the count that corresponds to the end of the selected partial interval 21, the weight values produced during the partial interval 21 are read out of the buffer storage unit and made available to the filtering device to form the mean value.

In particular, this can occur by converting all of the travel distances expressed by the counts that have been reached to travel times on the basis of the constant conveyance speed of the belt conveyor. This produces a time base, which starts in each case with the detection of the leading edge 18 of the product 14 by the sensor device 17. When the travel time that corresponds to the end of the partial interval 21 marked by the mark 22 has elapsed, the weight values for the elapsed travel time that corresponds to the selected partial interval 21 are transferred from the buffer storage unit to the filtering device.

The control scale has an input device with which the user can preset a partial interval. For example, this is accomplished by inputting the total travel time that elapses from the detection of the leading edge 18 by the sensor device 17 until the end of the partial interval indicated by the mark 22 in FIG. 2 and by inputting the remaining travel time that corresponds to the length of the selected partial interval 21. The weight values detected by the load cell 13 during the conveyance of a product 14 over the belt conveyor 4 are then evaluated for the input partial interval and for various modified adjustment of partial intervals. The partial interval that yields the smallest standard deviation or variance of the detected weight values is selected as the optimum partial interval and retained for the formation of the weighing result. The partial intervals that are used are determined by a random generator algorithm and can be varied over and over again. A specific number of products can be preset during which the determination of an optimum partial interval is carried out.

To speed up the adjustment of the optimum partial interval, restrictions for the partial intervals that are used can be provided. In particular, a tolerance window defined in relation to the position of the sensor device 17 can be preset for the end of the given partial interval. In addition, a tolerance limit can be established for the maximum length of the partial interval.

The mean value associated with the partial intervals can vary with the variation of the partial intervals. These mean value fluctuations associated with the continuous optimization can be computationally compensated in the weighing result. To this end, a factor can be used to correct the mean value computed from the optimum adjustment. This factor can be defined as a quotient of the mean value computed with the partial interval preset at the beginning of the optimization process and the mean value computed with the partial interval found by the optimization.

The components used to perform the optimization process discussed above, especially the filtering device and the selection device with its counter and buffer storage unit, can be realized by a microprocessor system. The accommodation of these components in the base frame 2 of the control scale is schematically illustrated in FIG. 1 by reference number 24. FIG. 1 also shows that the microprocessor system can have a display screen, on which the various operations and adjustments of the control scale are displayed. However, the filtering device is preferably realized by a separate microprocessor installed in the load cell 13.

In FIG. 1, the direction of conveyance of the products 14 is from left to right. It should be pointed out that the control scale can be designed to allow reversal of the direction of conveyance. In this case, the discharge conveyor 5 takes on the function of the feed conveyor 3 and vice versa. Accordingly, a sorting device 16' that corresponds to the sorting device 16 is shown in FIG. 1 at the feed conveyor 3.

LIST OF REFERENCE NUMBERS 1 supports
2 base frame
3 feed conveyor
4 belt conveyor
5 discharge conveyor
6, 7, 8 rollers
9, 10, 11 electric motors
12 tachometer generator
13 load cell
14 product
16, 16' sorting device
17 sensor device
18 leading edge
19 trailing edge
20 direction of conveyance
21 double arrow
22 mark
23 double arrow
24 microprocessor system

The invention claimed is:

1. Method for weighing products, the method comprising individually feeding the products to a measuring interval and conveying the products along the measuring interval, during which weight values are determined at regular intervals, and forming mean values and variances from the weight values detected on a partial interval of the measuring interval to determine the weighing result, further comprising determining, for a number of different partial intervals each, the variance of the detected weight values and selecting the partial interval having the smallest variance for determining the weighing result.

2. Method in accordance with claim 1, comprising presetting a partial interval, and obtaining the different partial intervals from the present partial interval by random variations.

3. Method in accordance with claim 1, comprising presetting a lower limit for the distance between the beginning of the partial intervals and the beginning of the measuring interval for the different partial intervals.

4. Method in accordance with claim 1, comprising presetting an upper limit for the length of the different partial intervals.

5. Method in accordance with claim 1, comprising expressing the partial intervals in terms of a travel time along the measuring interval on the basis of a constant rate of conveyance of products.

6. Method in accordance with claim 3, comprising expressing the limits in terms of a travel time along the measuring interval on the basis of a constant rate of conveyance of the products.

7. Device for weighing products, the device comprising a belt conveyor (4) that serves as a measuring interval, to which the products are individually delivered and on which the products are conveyed in a direction of conveyance; further comprising a load cell (13) on which the belt conveyor (4) is supported and which detects weight values at regular time intervals; a sensor device (17) which is coordinated with the belt conveyor (4) and detects the leading end (18) and the trailing end (19) of each conveyed product (14) that passes through its detection zone; and a filtering device and a selection device assigned to the filtering device for determining the weighing result on the basis of mean values and variances formed from weight values detected on a partial interval; wherein, to determine the weighing result, the partial interval with the smallest variance is selected by the selection device from among a number of different partial intervals, for each of which the variance of the weight values detected on it is formed.

8. Device in accordance with claim 7, wherein a pulse generator (12) that generates a pulse sequence proportional to the conveyance motion of the belt conveyor (4) is assigned to the belt conveyor (4), and a counter, which serves to count the pulses of the pulse sequence, is reset by the output signal of the sensor device (17) when the leading end (18) of a product (14) is detected and then starts to count the incoming pulses, such that the beginning and the end of each partial interval is determined by suitable counts of the counter.

9. Device in accordance with claim 8, wherein the count that determines the beginning of each partial interval is the count reached when the trailing end (19) of the product (14) is detected by the sensor device (17).

10. Device in accordance with claim 7, wherein a buffer storage unit is provided, which is used for the temporary storage of a series of weight values detected up to the present time and from which the weight values corresponding to the selected partial interval can be supplied to the filtering device.

* * * * *